Jan. 5, 1943. K. C. MONROE 2,307,228
INTERLOCKED VERTICAL BROACHING MACHINE
Filed May 9, 1940 7 Sheets-Sheet 1
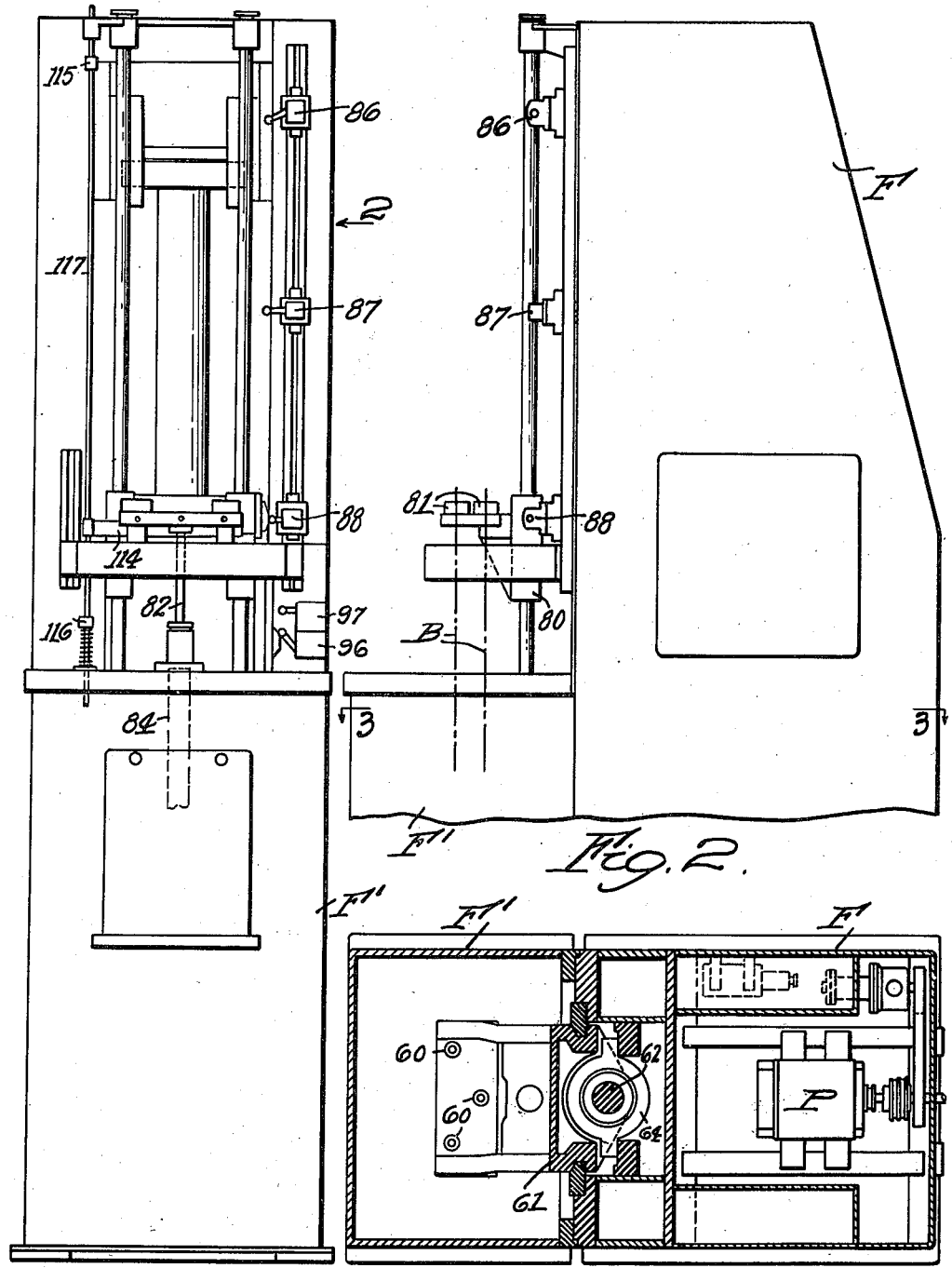

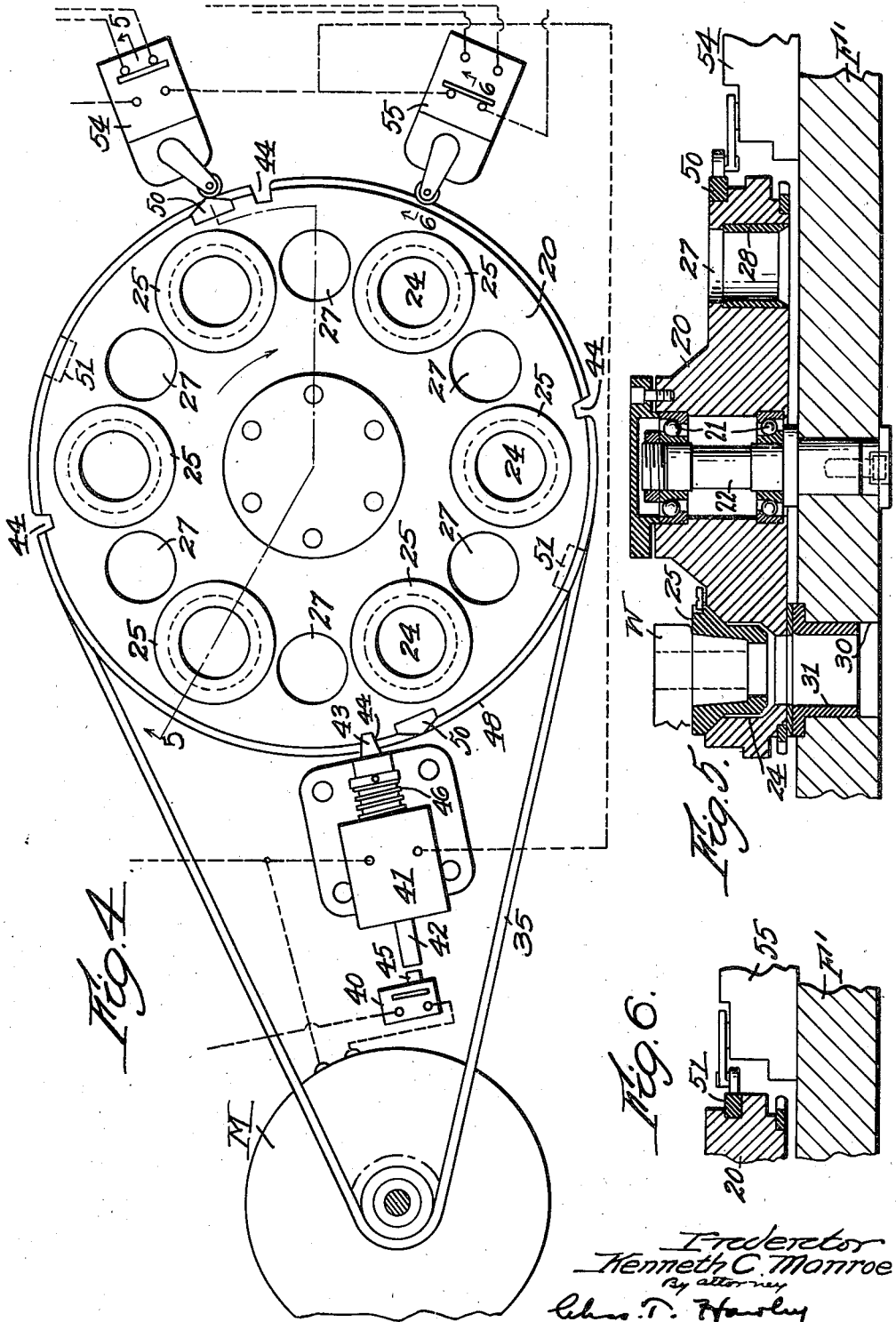

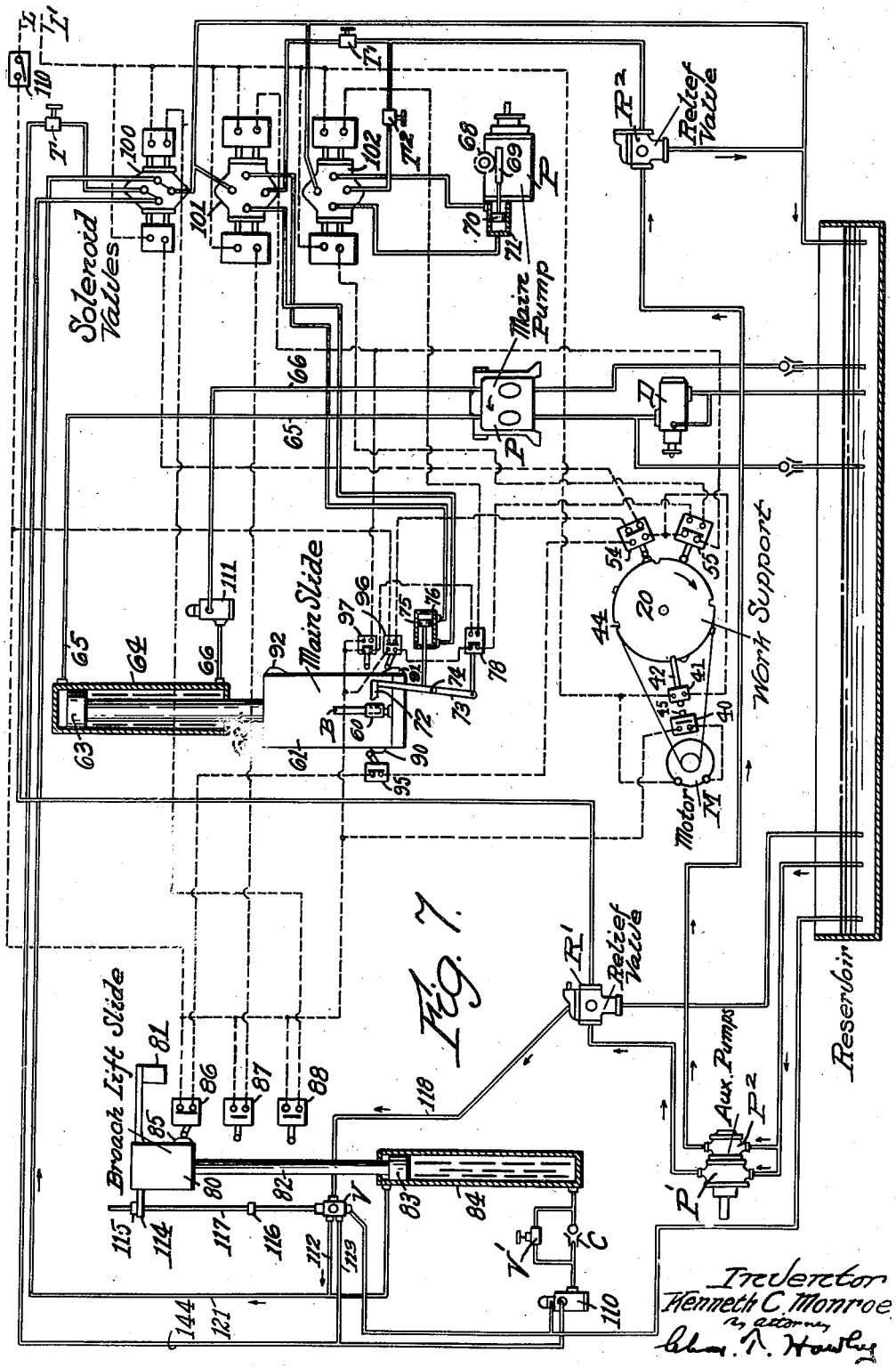

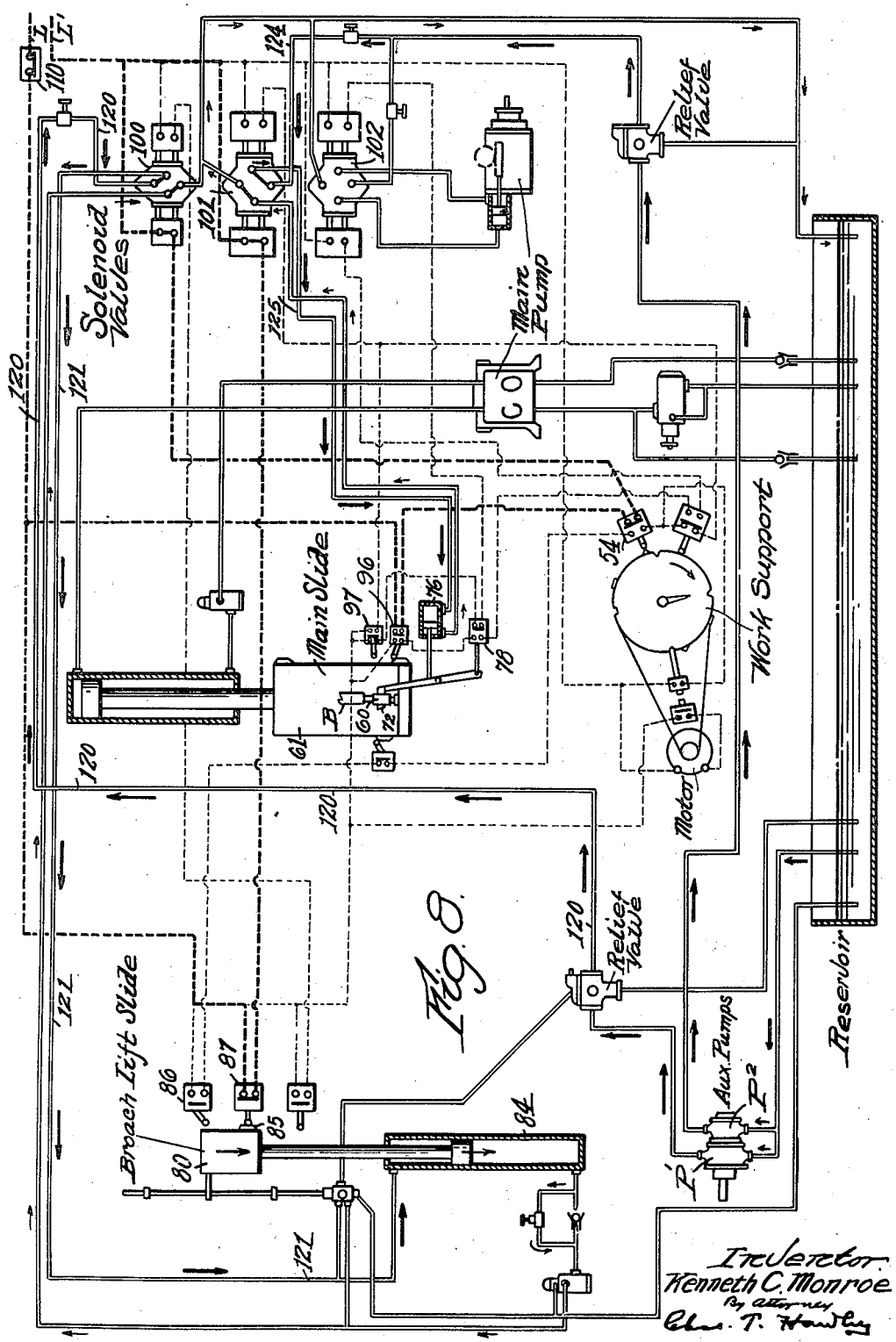

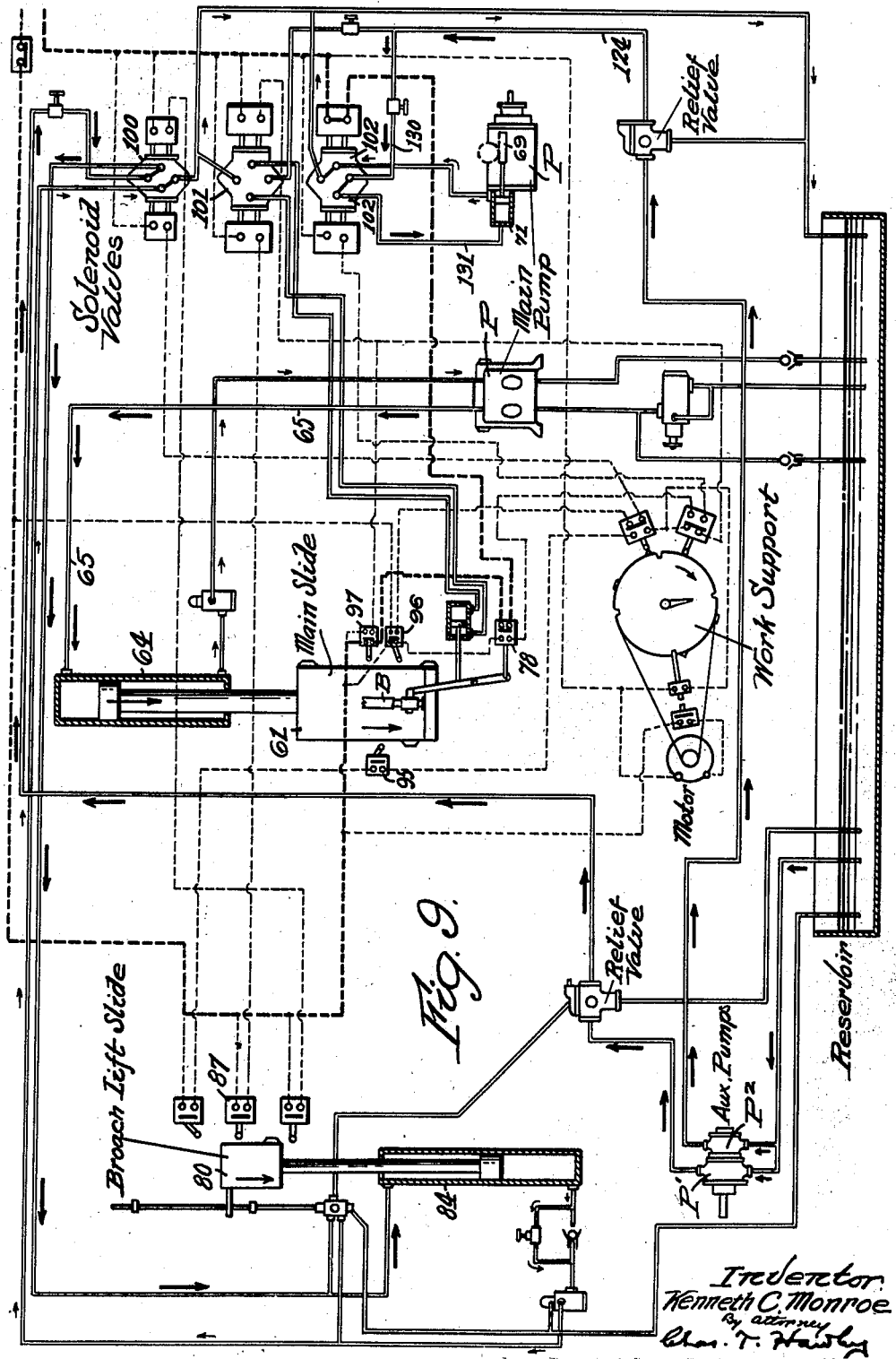

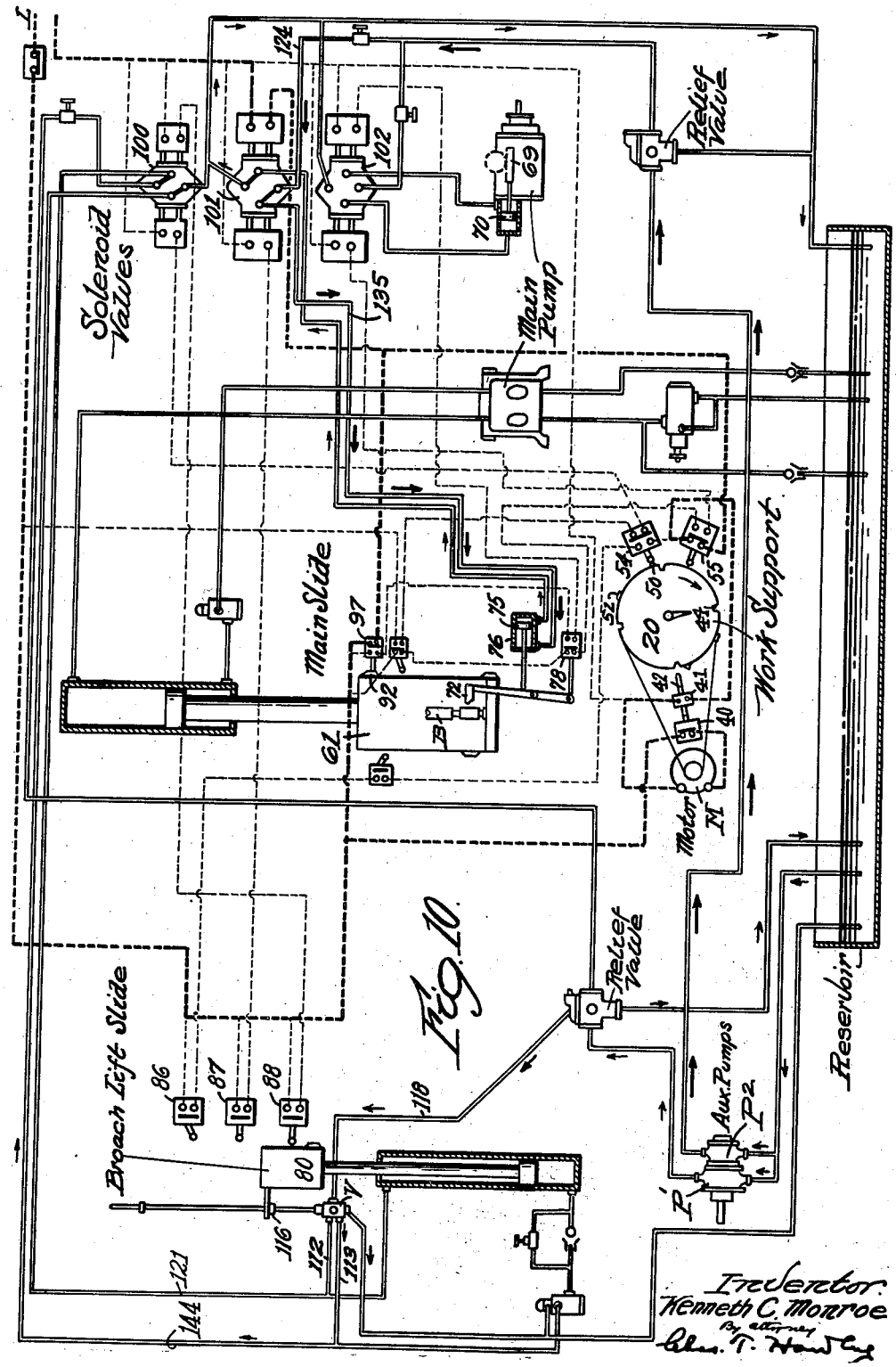

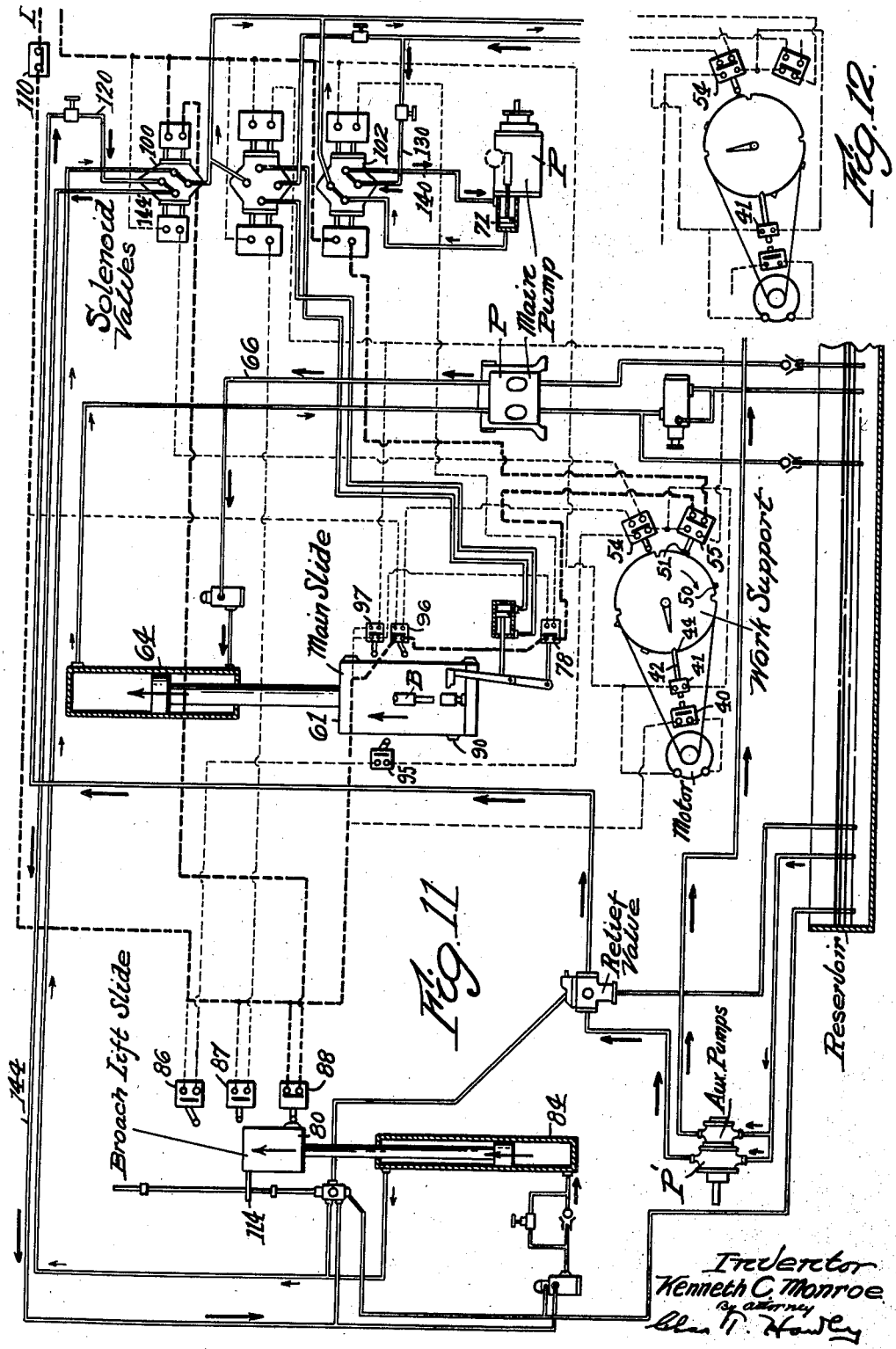

Patented Jan. 5, 1943

2,307,228

UNITED STATES PATENT OFFICE 2,307,228

INTERLOCKED VERTICAL BROACHING MACHINE

Kenneth C. Monroe, Hudson, Mass., assignor to The Lapointe Machine Tool Company, Hudson, Mass., a corporation of Maine Application May 9, 1940, Serial No. 334,255

10 Claims. (Cl. 90—33)

This invention relates to machines for broaching metal parts and more particularly to broaching machines of the vertical pull-down type, in which the work is held on a work support and in which one or more broaches are pulled downward through the work by a hydraulically actuated main slide and puller heads. In such machines, power-actuated lifter heads are usually provided for return of the broaches to raised position above the work support.

It is the general object of my invention to provide interlocking electric and hydraulic control devices for a machine of the type described, by which control devices the operation of the machine is made fully automatic, except for manual presentation and removal of the work pieces.

Another object of the invention is to provide control devices so interlocked that the machine will immediately stop if any step in the ordered performance of the work cycle does not take place or is not completed.

An important feature of the invention relates to the provision of a rotatable work support, together with special devices for intermittent indexing said work support in predetermined relation to the movements of the broach or broaches. Preferably, the work support is indexed to successive working and idle positions, in which successive positions working and return movements of the broaches are respectively performed.

My invention further relates to arrangements and combinations of parts which will be hereinafter described and more particularly pointed out in the appended claims.

A preferred form of the invention is shown in the drawings, in which:

Fig. 1 is a front elevation of my improved machine;

Fig. 2 is a partial side elevation, looking in the direction of the arrow 2 in Fig. 1;

Fig. 3 is a sectional plan view, taken along the line 3—3 in Fig. 2;

Fig. 4 is an enlarged plan view of the work support and indexing mechanism;

Fig. 5 is a partial sectional elevation, taken along the irregular line 5—5 in Fig. 4;

Fig. 6 is a detail sectional elevation, taken along the line 6—6 in Fig. 4;

Fig. 7 is a diagrammatic view showing the electric and hydraulic interlocks and connections in the positions assumed just before a work cycle is started;

Fig. 8 is a similar view, showing the parts with broaches inserted and locked, and the cut about to begin;

Fig. 9 is a similar view, showing the parts soon after the cut has been started;

Fig. 10 is a similar view, showing the parts with the cut completed, the keys withdrawn, and the first indexing about to begin;

Fig. 11 is a similar view, showing the parts with the first indexing completed, broaches reinserted in the lifter heads, and both slides moving upward; and Fig. 12 is a detail view showing the index control mechanism at the end of the second indexing operation.

Referring to the drawings, my improved broaching machine comprises a frame or casing F having an offset lower front frame member F'. A rotatable work support 20 (Figs. 4 and 5) is centered by ball bearings 21 on an upright stud 22 fixed in a top portion of the offset frame member F'.

The work support 20 is provided with a series of holes 24 having steel bushings 25 in which work pieces W are supported during the downward travel of the broaches through the work to perform a broaching operation. The work support 20 is also provided with interposed openings 27 having guide sleeves 28 through which the broaches pass in their upward idle return movement.

The top portion of the frame member F'' is similarly provided with a series of openings 30 having flanged bushings 31 through which the broaches pass on both their working and return stroke. The work support 20 is intermittently advanced to alternately position sets of openings 24 and 27 respectively in alignment with the openings 30 in the fixed frame member F''.

Any desired number of openings 24, 27 and 30 may be provided, but in the construction herein shown, six openings 24 and six interposed openings 27 are provided in the work support, with three openings 30 in the fixed frame member F''. Three separate broaches B are provided, and the work pieces W are placed on the work support in sets of three, so that identical broaching operations on three separate pieces will be performed at each working stroke, after which the work support will be indexed and advanced 90° to bring three of the openings 27 in alignment with the three broaches B, which are then returned upward through the openings 27.

After the broaches have been passed upward through the work support, the support is again intermittently advanced 90°, thus completing a half revolution from the initial setting and presenting three new work pieces in broaching position.

The means which I have provided for intermittently advancing the work support comprises a motor M (Fig. 4) connected by a belt or chain 35 to the work support 20 which is intermittently rotated thereby. The motor M is provided with a normally open switch 40. A solenoid 41 is mounted on the frame member F' adjacent the switch 40 and is provided with a plunger 42 having a tapered end portion 43 adapted to seat in notches 44 in the periphery of the work support 20. The outer end of the plunger 42 is in alignment with a stud 45 in the switch 40. A spring 46 normally holds the plunger 42 seated in one of the notches 44.

When the solenoid 41 is energized, the plunger 42 is withdrawn from the notch 44 and simultaneously engages the stud 45 and closes the switch 40 to start the motor M. The end 43 of the plunger is then engaged by the peripheral surface 48 of the support 20, which will maintain the switch 40 closed until the plunger drops into the next notch 44, and even if the circuit of the solenoid 41 is broken before the quarter revolution of the work support is completed.

The work support is provided with upper and lower sets of cam members 50 and 51, which coact with switches 54 and 55 respectively. Each switch 54 and 55 controls two separate electric circuits, and when either switch is engaged by a cam member, one circuit through the switch will be broken and the other will be simultaneously closed.

The general mechanical operation of the machine is similar to the operation described in detail in the prior patent to West, No. 2,135,157, issued November 1, 1938. At their lower ends, the broaches B are detachably connected to three puller heads 60 (Figs. 3 and 7), which heads are mounted on a main slide 61 connected by a piston rod 62 to a piston 63 in a main cylinder 64. The upper and lower ends of the cylinder 64 are connected by pipes 65 and 66 (Fig. 7) to a main pump P which is preferably of the reversible, variable delivery type shown in the prior patent to West, No. 1,722,832, issued July 30, 1929. The rate and direction of discharge of the pump P is controlled through a gear 68 engaged by a rack 69 which is actuated by a piston 70 in a control cylinder 71.

The broaches B are secured in the puller heads 60 by keys 72 (Fig. 7) moved by a lever 73 pivoted at 74 and actuated by a piston 75 in a cylinder 76. The lower end of the lever 73 is also connected to a switch 78 in such manner that one circuit through the switch will be opened and a second circuit will be closed as the key 72 is inserted in the puller head 60. When the key is withdrawn, the circuits are reversed. It will be understood that the lever 73, pivot 74, cylinder 76 and switch 78 are all mounted to move with the main slide 61.

A broach lift slide 80 is provided with a plurality of lifter heads 81 adapted to engage the upper ends of the broaches B and to move the broaches upward for their return strokes. The slide 80 is connected by a piston rod 82 to a piston 83 in a broach lift cylinder 84. The broach lift slide 80 is also provided with a cam plate 85 adapted to separately engage and close a series of normally open switches 86, 87 and 88. The switches are so devised that the switch 88 closes just after the up-stroke begins and the switch 87 closes only on the down-stroke and opens as soon as released.

The main slide 61 is also provided with cam plates 90, 91 and 92. The plate 90 is adapted to close a circuit controlled by the switch 95 when the slide 61 is in raised position, the plate 91 is adapted to reverse the circuits in a switch 96 when the slide is in raised position, and the plate 92 is adapted to reverse the circuits in a switch 97 when the slide 61 is in lowered position.

Three solenoid-controlled valves 100, 101 and 102 are provided, of which the valve 100 will remain in either its right-hand or left-hand operative position until positively moved therefrom, while the valves 101 and 102 are self-centering and will each return to mid or neutral position as soon as the solenoid circuit controlling the valve is opened.

The solenoid valve 100 controls the admission of oil under pressure from an auxiliary pump P' to the broach lift slide cylinder 84. The solenoid valve 101 controls the admission of oil under pressure from an auxiliary pump $P^2$ to the key-operating cylinder 76, and the solenoid valve 102 controls the admission of oil under pressure from the auxiliary pump $P^2$ to the cylinder 71 which controls the direction and rate of discharge of the main pump P, which is also self-centering and returns to neutral or no-discharge position when the solenoid valve 102 is centered.

Electricity is supplied through line wires L and L' and a main switch 110, with the wiring circuits shown in broken lines in Figs. 7 to 12.

The hydraulic connections are shown by double lines in Figs. 7 to 12 and include relief valves R' and $R^2$ for the pumps P' and $P^2$ respectively, a vent valve V, control or throttle valves T, T' and $T^2$, a by-pass needle valve V', a check valve C, back-pressure valves 110 and 111 for the cylinders 84 and 64 respectively, and a differential valve D for the pump P.

The vent valve V is so constructed that when the broach lift slide 80 reaches either limit of travel, engagement of an arm 114 thereon with either collar 115 or 116 on a slide rod 117 will move the valve V to connect the vent pipe 118 of the relief valve R' to atmosphere through one of the pipes 112 or 113 and one of the lifter cylinder connections 121 or 144. The valve R', when thus vented, unloads the auxiliary pump P'.

The needle valve V' regulates the rate of movement of the lifter slide 80 during its down stroke.

Briefly stated, the general method of operation of my improved broaching machine is as follows:—

Assuming that work pieces are in place in the three rearmost bushings 25 of the work support 20 (Fig. 4) and that broaches B are suspended from the lifter head 81, oil is admitted to the top of the broach lift cylinder 84 and the broach lift slide starts downward, passing the lower ends of the broaches B through the work and inserting them in the puller heads 60. Oil is then admitted to the right-hand end of the cylinder 76, which causes the keys 72 to be inserted to lock the broaches in the puller heads.

The main slide 61 and lifter slide 80 then move downward in unison and the broaches are pulled through the work for a broaching operation. Near the lower end of the working stroke, the broaches are released from the lifter heads 81 and are drawn further downward through the work and through the rotatable work support 20 by the main slide 61 and puller heads 60. The keys 72 are then automatically withdrawn.

The work support 20 is next automatically indexed 90° to bring three of the openings 27 in alignment with the lowered broaches B. The main slide is then started upward, and the upper ends of the broaches are passed through the holes 27 and are re-engaged with the lifter heads 81. The lifter slide 80 and heads 81 then move upward at increased speed, so that the broaches reach extreme raised position above the work support and the finished work pieces by the time the main slide completes its upward movement.

The work support 20 is then indexed another 90° to bring three new work pieces under the raised broaches and to bring the finished work pieces to the front of the machine, where they may be removed and new work pieces substituted by the operator while the machine is automatically performing the next broaching operation.

The machine will continue to operate automatically on the work cycle above described until its operation is interrupted by the operator or until some part of the work cycle is not effectively performed, in which case the machine will stop automatically and will refuse to operate further until the defective action of the machine has been corrected or the defective work piece has been removed.

The detailed operation of the electric and hydraulic interlocking devices will now be described with reference to the diagrams, Figs. 7 to 12 inclusive.

Fig. 7 shows all parts of the apparatus in idle position but ready to perform a broaching operation.

The manual switch 110 is first closed by the operator and the several parts then assume the positions shown in Fig. 8, with the broaching cuts about to commence. Closing of the switch 110 connects the line wire L through the switches 96 and 54 (Fig. 8) to the left-hand end of the solenoid valve 100, which causes the valve to shift and connect a pipe 120 from the auxiliary pump P' to a pipe 121, which in turn connects to the upper end of the lifter cylinder 84. This causes the lifter slide 80 to begin its downward movement, passing the lower ends of the broaches B through the work pieces and inserting the broaches in the puller heads 60. The cam plate 85 on the lifter slide 80 then closes the switch 87, which connects the line wire L to the left-hand end of the solenoid valve 101, causing the valve to shift and connect a pipe 124 from the auxiliary pump P² to a pipe 125 which connects to the right-hand end of the key-operating cylinder 76 and causes the keys 72 to be inserted in the lower ends of the broaches B. As the slide 80 starts down, the switch 86 opens and as the keys 72 are inserted, the connections through the switch 78 are reversed. The parts are now ready to begin the broaching stroke of the main slide 61.

Referring to Fig. 9, the reversing of the switch 78 connects the line wire L through the left-hand side of the switch 97 and the right-hand side of the switch 78 to the right-hand end of the solenoid valve 102. The solenoid valves 100 and 101 retain the same setting as in Fig. 8, but the valve 102 now shifts to the left, thus connecting the auxiliary pump P² through the pipe 124 and a branch pipe 130 to a pipe 131, which in turn is connected to the left-hand end of the pump control cylinder 71.

This causes the rack bar 69 to shift the main pump P to deliver oil under pressure through the pipe 65 to the top of the main cylinder 64. The main slide 61 now starts downward, which allows the switch 95 to open and the switch 96 to reverse and close the left-hand connection through said switch.

The auxiliary pump P' remains connected through the solenoid valve 100 to the upper end of the broach lift cylinder 84, so that the broach lift slide applies pressure to the upper ends of the broaches B and assists the main slide 61 in pulling the broaches downward through the work. At about mid-stroke of the lifter slide 80, the switch 87 opens.

The last described operative conditions are now maintained until the down stroke of the main slide is completed, it being noted that the broaches are mechanically released from the broach lifters 81 near the end of their downward movement, so that the broaches can be pulled completely through the work pieces W and through the work support 20.

Referring to Fig. 10, the broach lift slide 80 is shown to have completed its downward movement but without closing the switch 88, and the slide is also shown to have engaged the collar 116 and moved the vent valve V, connecting the pipe 118 to the pipes 113 and 144 and thus causing the auxiliary pump P' to be unloaded.

The main slide 61 is also at its lower limit of travel and its cam plate 92 has engaged and reversed the switch 97, thus connecting the line wire L to the right-hand end of the solenoid valve 101. This moves the valve 101 to connect the auxiliary pump P² through the pipe 124 and a pipe 135 to the left-hand end of the key-operating cylinder 76, which causes the piston 75 to move to the right and withdraw the keys 72, and at the same time reverses the connections through the switch 78.

The closing of the switch 97 by the cam plate 92 not only causes the solenoid valve 101 to be shifted but also completes a circuit through the switch 55 to the solenoid 41 in the index mechanism. The solenoid 41 is thus energized, withdrawing the plunger 42, which in turn closes the index motor switch 40 and causes the motor M to start the indexing movement of the work support 20.

When the switch 97 is reversed by the cam plate 92, the holding circuit of the solenoid valve 102 is broken, which causes the valve 102 to return to mid-position, releasing the pressure on the piston 70 and allowing the piston 70 and rack 69 also to return to mid-position, these parts being spring-actuated and self-centering when released. The pump P is thus placed in neutral or no-discharge position.

As soon as the indexing movement starts, the cam member 50 will move away from the switch 54, which will then reverse its connections, with later results to be described. The indexing operation will continue however until a cam member 51 reverses the connections through the switch 55, thus opening the circuit through the plunger solenoid 41 and releasing the plunger 42. The plunger cannot move toward the work support to open the motor switch 40, however, until the next notch 44 in the work support comes into alignment with the plunger 42. When this happens, the motor circuit is broken and the work support comes to rest 90° from its original position.

The operative steps indicated in Fig. 11 now take place. A circuit is first closed from the line wire L through the switches 96, 78 and 55 successively to the right-hand end of the solenoid valve 102, which is shifted to the position indicated in Fig. 11 to admit oil through the branch pipe 130 and a pipe 140 to the right-hand end of the pump control cylinder 71, which shifts the main pump P to supply oil under pressure through the pipe 66 to the lower end of the main cylinder 64, thus causing the main slide 61 to begin its upward travel.

As soon as this upward travel begins, the broach lift slide 80 is pushed upward by the main slide 61 and broaches B and closes the switch 88, thus connecting the line wire L to the right-hand end of the solenoid valve 100 and admitting oil under pressure from the auxiliary pump P' through the pipe 120 and the pipe 144 to the lower end of the broach lift cylinder 84. The broach lift slide 80, lifter heads 81 and reconnected broaches B then move upward more rapidly than the main slide. The slide 80 passes the switch 87 without closing it on its upward stroke and returns to the position shown in Fig. 7, with the valve 86 again closed and with the arm 114 engaging the collar 115 and venting the pipe 118 through the pipe 112 and lifter cylinder connection 121, thus unloading the auxiliary pump P'.

As the main slide 61 reaches its original upward position, the cam plate 90 closes the switch 95, thus completing the index control circuit from the line wire L through the switches 86, 95 and 54 successively to energize the plunger solenoid 41 and cause the plunger 42 to close the motor switch 40 and start a second indexing movement of the work support 20. This movement will continue until the switch 54 is opened by a cam member 50 on the work support, whereupon the indexing will stop as soon as the plunger 42 drops into the next notch 44 in the work support 20, which will be at the completion of 180° rotation from its original position.

When the indexing is thus completed, the switch 54 will not only be moved to break the circuit for the solenoid 41 as shown in Fig. 12, but will also complete the circuit through the left-hand end of the solenoid valve 100, thus shifting the valve to start a second work cycle. This cycle of operations will be repeated indefinitely until the switch 110 is manually opened, or until some part of the apparatus fails to function properly or to complete its prescribed movement.

While the electrical control has been shown for clearness as a simple two-wire system with direct operation of switches and solenoids, it will be understood that in actual operation heavier operating currents may involve the use of relays and secondary switches in accordance with recognized commercial practice.

In the foregoing description, identical broaching operations have been performed on three work pieces at each broaching stroke. By using three progressive broaches and additional cam members 50 and 51, the work support may be indexed 30° only and each work piece may be successively engaged by each of the three broaches. Other desired combinations may be similarly arranged.

Having thus described my invention and the advantages thereof, I do not wish to be limited to the details herein disclosed, otherwise than as set forth in the claims, but what I claim is:

1. In an automatic hydraulic vertical pull-down broaching machine having a main broaching slide and puller heads, a lifter slide and lifter heads, hydraulic actuating mechanism for said slides and means to selectively supply oil under pressure to actuate said slides, that improvement which comprises providing a rotatable work support having alternate work-holding and broach return stations, means to automatically index the work support to bring a broach return station in alignment with said broach at the end of each broaching stroke, and means to automatically index said support to its next broaching position at the end of the return movement of the main slide.

2. In an automatic hydraulic vertical pull-down broaching machine, a broach, means to give said broach alternate broaching and broach return movements, a work support having a series of work-holding stations and having interposed broach-return stations, and automatic means to intermittently advance said work support to position a work-holding station thereof and a broach-return station thereof alternately in alignment with said broach for said broaching and broach return movements respectively.

3. In an automatic hydraulic vertical pull-down broaching machine, a broach, means to give said broach alternate broaching and broach-return movements, a work support having a series of work-holding stations and having interposed broach-return stations, and automatic means to intermittently advance said work support to position a work-holding station thereof and a broach-return station thereof alternately in alignment with said broach for said broaching and broach-return movements respectively, said automatic means for advancing the work support comprising a motor, a switch to start said motor, a plunger to lock said work support, recesses in said support to receive the end of said plunger, a solenoid to withdraw said plunger, thereby releasing said support and closing the motor switch, a spring to return said plunger to locking position, and means to prevent return of said plunger and opening of said switch until a recess in said support is aligned with said plunger.

4. An automatic hydraulic vertical pull-down broaching machine comprising a rotatable work support having alternately disposed work-holding and broach-return stations, a broach, means to pull the broach down through the work when the work support presents a work-holding station in broaching position, means to give the work support a predetermined angular advance movement after each broaching operation and also after each broach-return operation to present work-holding and broach return stations alternately in alignment with said broach, means to automatically initiate another work cycle as soon as one work cycle is completed, and control devices operatively interlocking all parts of said machine and effective to stop the machine on variation in the operation thereof from the above described work cycle.

5. An automatic hydraulic vertical pull-down broaching machine comprising a rotatable work support having alternately disposed work-holding and broach-return stations, a main slide, a broach, means to insert a key to lock the broach to the main slide, means to pull the broach down through the work when the work support presents a work-holding station in broaching position, means to withdraw the key, means to give the work support a predetermined angular advance movement after each broaching operation and also after each broach-return operation, and control devices operatively interlocking all parts of said machine and effective to stop the machine if the key is not inserted and is not withdrawn at predetermined points in the work cycle.

6. An automatic hydraulic vertical pull-down broaching machine comprising a rotatable work support having alternately disposed work-holding and broach-return stations, a broach, means to pull the broach down through the work when the work support presents a work-holding station in broaching position, means to give the work support a predetermined angular advance movement from broaching to broach-return position after each broaching operation and also from broach-return position to the next broaching position after each broach-return operation, means to automatically initiate another work cycle as soon as one work cycle is completed, and control devices operatively interlocking all parts of said machine and effective to stop the machine whenever the work support is not advanced from a broaching to a broach return position immediately after a cutting stroke of the broach.

7. In an automatic hydraulic vertical pull-down broaching machine having a main broaching slide and puller head, a lifter slide and lifter head, hydraulic actuating mechanism for said slides and means to selectively supply oil under pressure to actuate said slides, that improvement which comprises providing means to insert and withdraw a key in said puller head, and means to prevent upward return movement of the main slide until said key has been withdrawn from said puller head.

8. In an automatic hydraulic vertical pull-down broaching machine having a main broaching slide and puller head, a lifter slide and lifter head, hydraulic actuating mechanism for said slides and means to selectively supply oil under pressure to actuate said slides, that improvement which comprises providing means to insert and withdraw a key in said puller head, a reversible variable discharge pump to supply oil to the main slide, and means to prevent effective operation of said pump to cause a broaching movement of said main slide until said key has been inserted in the puller head and to prevent effective operation of said pump to cause a return movement of said slide until said key has been withdrawn from said puller head.

9. In an automatic hydraulic vertical pull-down broaching machine having a broach, a main broaching slide and puller head, a lifter slide and lifter head, hydraulic actuating mechanism for said slides and means to selectively supply oil under pressure to actuate said slides, that improvement which comprises providing a movable work support having alternate work-holding and broach-return stations, means to move said support between broaching and return movements of the main slide to bring a broach-return station in alignment with said broaches and to thereby permit free upward return of the broach, and means to move said support to bring a work-holding station in broaching position after said broach-return movement has been completed.

10. In an automatic hydraulic vertical pull-down broaching machine having a main broaching slide and puller heads, a lifter slide and lifter heads, hydraulic actuating mechanism for said slides and means to selectively supply oil under pressure to actuate said slides, that improvement which comprises providing means to insert and withdraw keys in said puller heads, a solenoid-operated valve controlling the key-handling means, a second solenoid-operated valve controlling the broach-lifting means, a third solenoid-operated valve controlling the means for actuating the main slide, a plurality of control devices operatively interlocking said valves and causing said valves to be shifted in a predetermined sequence only, additional means to automatically index the work support after each broaching operation and after each broach-return operation, and additional interlocking devices to effect said indexing movements in predetermined relation to the movements of said valves and of the slides and keys controlled thereby.

KENNETH C. MONROE.